(12) United States Patent
Abbiati et al.

(10) Patent No.: US 10,274,692 B2
(45) Date of Patent: Apr. 30, 2019

(54) OPTICAL TERMINATION MODULE, OPTICAL TERMINATION ASSEMBLY WITH SAID OPTICAL TERMINATION MODULE AND ELECTRIC CABINET WITH SAID OPTICAL TERMINATION MODULE

(71) Applicant: Prysmian S.p.A., Milan (IT)

(72) Inventors: Fabio Abbiati, Milan (IT); Arnaud Le Dissez, Milan (IT)

(73) Assignee: Prysmian S.p.A., Milan (IT)

( * ) Notice: Subject to any disclaimer, the term of this patent is extended or adjusted under 35 U.S.C. 154(b) by 12 days.

(21) Appl. No.: 15/528,129

(22) PCT Filed: Nov. 20, 2014

(86) PCT No.: PCT/EP2014/075126
§ 371 (c)(1),
(2) Date: May 19, 2017

(87) PCT Pub. No.: WO2016/078712
PCT Pub. Date: May 26, 2016

(65) Prior Publication Data
US 2017/0343761 A1    Nov. 30, 2017

(51) Int. Cl.
*G02B 6/44*     (2006.01)
*G02B 6/38*     (2006.01)
*H04Q 1/14*    (2006.01)

(52) U.S. Cl.
CPC ......... *G02B 6/4472* (2013.01); *G02B 6/3897* (2013.01); *G02B 6/44* (2013.01);
(Continued)

(58) Field of Classification Search
CPC .. G02B 6/4472; G02B 6/4452; G02B 6/3897; G02B 6/4466; G02B 6/4457; G02B 6/44; H04Q 1/14
See application file for complete search history.

(56) References Cited

U.S. PATENT DOCUMENTS

| 4,832,436 A * | 5/1989 | Goto ................... G02B 6/4452 385/53 |
| 4,948,220 A * | 8/1990 | Violo .................. G02B 6/4452 385/55 |

(Continued)

FOREIGN PATENT DOCUMENTS

| DE | 3116869 A1 | 11/1982 |
| JP | 60-136704 A | 7/1985 |

OTHER PUBLICATIONS

International Search Report and Written Opinion dated Jul. 22, 2015, in PCT/EP2014/075126, filed Nov. 20, 2014.

*Primary Examiner* — Ryan A Lepisto
*Assistant Examiner* — Erin D Chiem
(74) *Attorney, Agent, or Firm* — Oblon, McClelland, Maier & Neustadt, L.L.P.

(57) ABSTRACT

An optical termination module (50) comprises a fixed part (60) to be attached to a mounting member (108) of an electric cabinet (100) and a movable part (70) rotatably attached to the fixed part (60) to move relative to the fixed part (60) about a rotation axis (X-X) between a first position and a second position. The fixed part (60) has a bottom surface (61*a*) with an inlet opening (61*b*) configured to receive an optical drop cable (1) and the movable part (70) has a bottom surface (71*a*) with one or more outlet openings (71*b*) configured to receive respective one or more optical customer cables (5).

21 Claims, 6 Drawing Sheets

(52) U.S. Cl.
CPC ......... *G02B 6/4442* (2013.01); *G02B 6/4446* (2013.01); *G02B 6/4452* (2013.01); *G02B 6/4454* (2013.01); *G02B 6/4455* (2013.01); *G02B 6/4457* (2013.01); *G02B 6/4466* (2013.01); *H04Q 1/14* (2013.01)

(56) References Cited

U.S. PATENT DOCUMENTS

| | | | |
|---|---|---|---|
| 5,204,929 A | 4/1993 | Machall et al. | |
| 6,081,644 A * | 6/2000 | Stateczny | G02B 6/4442 385/134 |
| 6,097,872 A | 8/2000 | Kusuda et al. | |
| 7,343,078 B2 * | 3/2008 | Spisany | H01R 9/2408 385/101 |
| 2004/0228598 A1 * | 11/2004 | Allen | G02B 6/4454 385/135 |
| 2010/0271472 A1 * | 10/2010 | Hubbard | G02B 6/4442 348/92 |

* cited by examiner

OPTICAL TERMINATION MODULE, OPTICAL TERMINATION ASSEMBLY WITH SAID OPTICAL TERMINATION MODULE AND ELECTRIC CABINET WITH SAID OPTICAL TERMINATION MODULE

FIELD OF THE INVENTION

The present invention relates to the field of equipment and components for the installation of optical cables in optical (access) networks. In particular, the present invention relates to an optical termination module and an optical termination assembly configured to be mounted in electric cabinet. The present invention relates also to an electric cabinet provided with said optical termination module.

BACKGROUND OF THE INVENTION

A FTTH ("Fiber To The Home") network is an optical access network providing a number of end customers with broadband communication services from operators, i.e. with services requiring data transmission at a very high rate, for example of some Mbit/s.

Within the framework of the present description and in the following claims, the term "optical access network" is used to indicate optical cables and devices forming the connecting architecture which is typically designed on the base of customer's residence, which can be either single dwelling units (houses) or multi dwelling units (apartment blocks).

Typically, a FTTH network comprises a central unit which is connected with one (or more) distribution box which is typically located in the basement of the building where the end customers reside.

From the distribution box, the final customer can be directly reached by an optical cable, hereinafter referred to as "drop cable".

Alternatively, when the distribution box is located in a building having multi dwelling units, for example arranged in a plurality of floors, intermediate optical modules are installed at each floor for receiving an optical cable, hereinafter referred to as "riser cable", which exits the distribution box and runs vertically through the building from the basement up to all the building floors. Typically, riser cables may contains up to 96 optical fibers. The connection between the intermediate optical modules and the customer's residence is then performed with drop cables.

Typically, drop cables are pre-connectorized (which means that at least one end of the cable is equipped with a connector, factory assembled and tested), in order to allow quick and easy connection, without need of qualified operators to make the connection between customer's residence and distribution box.

There is a growing need from the operators for using existing electric home cabinets in order to manage optical equipment, such as drop cables and optical termination modules in the space used for electric equipment, such as electric cables and power circuit breakers. In this context, drop cables and optical termination modules must be mounted on guides, commonly known as DIN rails, within cabinets where electric equipment, such as the power circuit breakers and electric cables, are mounted as well on the same guides.

However, existing electric home cabinets are not designed to manage optical cables and optical termination modules. Due to the very small room existing between rows of guides, the operator needs to access to the optical connectors for connecting the drop cables thereto in a simple and fast manner, possibly without entangling optical cables with electrical cables.

US 2005/0163448 discloses a multi-port optical connection terminal comprising a base and an upper surface provided with a plurality of angled or sloped surfaces. Each angled or sloped surface has a connector port. A stub cable enters into the multi-port optical connection terminal through the stub cable port. The optical fibers of the stub cable are pre-connectorized and the optical connectors are inserted into a sleeve seated in a respective one of the connector ports. One or more pre-connectorized drop cables may be interconnected with the stub cable by inserting the pre-connectorized end of each drop cable into a corresponding connector port from the exterior of the multi-port optical connection terminal.

U.S. Pat. No. 5,638,481 discloses a wall plate assembly with a lower portion and an upper portion pivotally mounted to the lower portion. A fiber storage spool is mounted to the rear of the upper wall. A member with a front face extends from the front face upper portion at an angle with the front face. The front face has apertures for holding couplers adapted to receive, for example, SC connectors. Such an arrangement minimizes any slack or unsupported lengths of fibers thereby avoiding tangling or interference with each others.

SUMMARY OF THE INVENTION

The Applicant has observed that, in the solution proposed in US 2005/0163448, the front mounting of the connector ports tangles up the management of the drop cables in the cabinet. Moreover, the fixed inclination of the connector ports makes it difficult for the operator to handle the connection of the pre-connectorized ends of the drop cables with the connector ports and, when needed, to inspect the connector ports. Furthermore, no arrangement is provided for managing excess of fibers.

The Applicant has perceived that also with the solution proposed in U.S. Pat. No. 5,638,481, the front mounting of the connector ports tangles up the management of the drop cables in the cabinet. Moreover, the fiber storage pool provided at the rear of the upper wall makes this solution unsuitable for DIN rail mounting such as those used in electric cabinets.

In view of the above, the Applicant has tackled the problem of providing an optical termination module and an optical termination assembly that can be installed in the customer electric cabinet to provide a termination of the drop cable of the operator within the customer cabinet and enabling further access to the optical line in a simple and fast manner, while reducing the possibility that optical cables (both the operator drop cable and the customer drop cable) entangle with electrical cables already installed in the same cabinet.

The Applicant has found that it is convenient to provide an optical termination module with a fixed part fit to be attached to a guiding member of an electric cabinet and a movable part rotatably attached to the fixed part, where a drop cable enters in the fixed part and a connector of a pre-connectorized optical fiber of the drop cable is housed in the movable part, being available for coupling with a customer cable.

Therefore, the present invention relates to an optical termination module comprising a fixed part configured to be attached to a mounting member of an electric cabinet, a movable part attached to said fixed part and movable relative to said fixed part between a first position and a second position, wherein said fixed part has an inlet opening configured to receive an optical drop cable and said movable part has one or more outlet openings configured to receive respective one or more customer optical cables.

Preferably, the inlet opening has an inlet axis and each outlet opening has a respective outlet axis, in the first position the inlet axis is parallel to each outlet axis and in the second position each outlet axis is inclined relative to the inlet axis.

Preferably, the rotation axis extends perpendicularly to the inlet axis and outlet axes.

Preferably, the inlet opening of the fixed part is arranged in the bottom of the fixed part, enabling direct access of the drop cable entering the cabinet from a lower floor.

Preferably, in the first position, the bottom surface of the fixed part and the bottom surface of the movable part lay on a same plane or on parallel planes.

Preferably, in the second position, the bottom surface of the fixed part is inclined relative to the bottom surface of the movable part.

Preferably, the rotation axis is arranged at an end portion of the fixed part and at an end portion of the movable part.

Preferably, the end portion of the fixed part and the end portion of the movable part are top end portions of the fixed part and the movable part.

Preferably, the movable part comprises one or more seats, each seat is arranged proximate to a respective outlet opening and is configured to receive a pre-connectorized optical connector of an optical fiber of an optical customer cable for optically connecting the optical fiber with a respective optical drop cable.

Preferably, the fixed part has a rear portion configured to face a mounting member and an opposite front portion facing the movable part, the rear portion of the fixed part comprises an attachment member for attaching the fixed part to the mounting member.

Preferably, the optical termination module comprises a fiber storage member arranged inside between the movable part and the fixed part and configured to storage slack of fibers of an optical drop cable.

Preferably, the fiber storage member is attached to the movable part.

Preferably, the opening is formed in a bottom surface of the fixed part and the one or more outlet openings are formed in a bottom surface of the movable part.

In another aspect, the present invention relates an optical termination assembly comprising:
an optical drop cable comprising one or more optical fibers terminated with corresponding pre-connectorized optical connectors,
an optical termination module housing an end portion of the optical drop cable,
wherein:
the optical termination module comprises
a fixed part configured to be attached to a mounting member of an electric cabinet,
a movable part rotatably attached to the fixed part to move relative to the fixed part about a rotation axis between a first position and a second position,
wherein:
the fixed part has a bottom surface with an inlet opening receiving the optical drop cable,
the movable part has a bottom surface with one or more outlet openings configured to receive respective one or more optical customer cables,
the optical drop cable enters the fixed part through the inlet opening, runs through the fixed part and the movable part and terminates with the pre-connectorized optical connectors arranged at the one or more outlet openings of the movable part for optically connecting the one or more optical fibers of the optical drop cable with respective one or more optical customer cables.

In still another aspect, the present invention relates to an electric cabinet comprising:
a wall,
a mounting member fixed to the wall,
an electric equipment attached to the mounting member,
an optical termination module as set forth above.

BRIEF DESCRIPTION OF THE DRAWINGS

The present invention will now be described in more detail hereinafter with reference to the accompanying drawings, in which some embodiments of the invention are shown.

DETAILED DESCRIPTION

For the purposes of the present description and claims an optical cable is deemed to be an optical cable comprising one or more optical fibers, possibly arranged inside one or more buffer tubes, an outer sheath and, optionally, one or more strength members.

An optical fiber typically comprises an optical waveguide, constituted by an optically transmissive core, surrounded by a cladding. The optical waveguide is preferably covered by at least one protective coating layer ("coating"). Typically two protective coating layers are present: the first coating layer ("primary coating") is in direct contact with the optical waveguide, while the second coating layer ("secondary coating") covers the primary coating. In addition, a buffer layer may cover each optical fiber, the buffer layer may be substantially in contact with the secondary coating ("tight buffer") or it may consist of a small tube of inner diameter somehow larger than the outer diameter of the secondary coating ("loose buffer").

Figure 1:
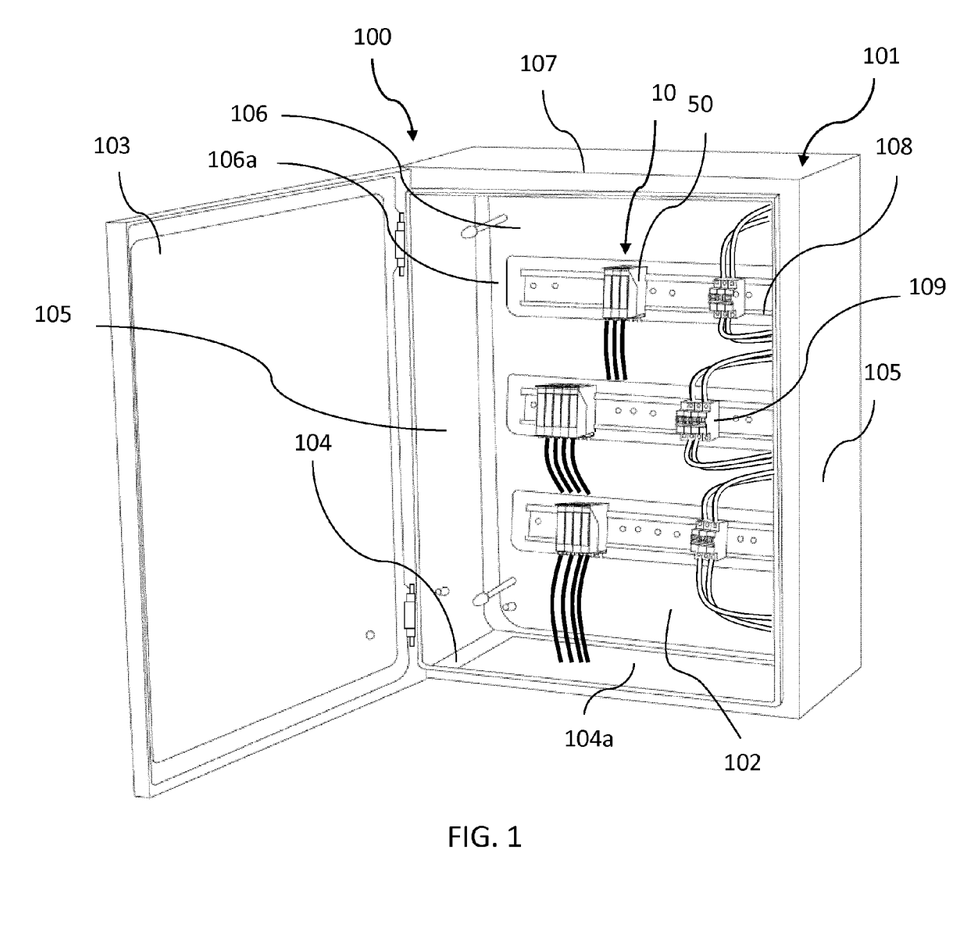
FIG. 1 is a perspective view of an embodiment of an electric cabinet according to the invention.
Figure 2:
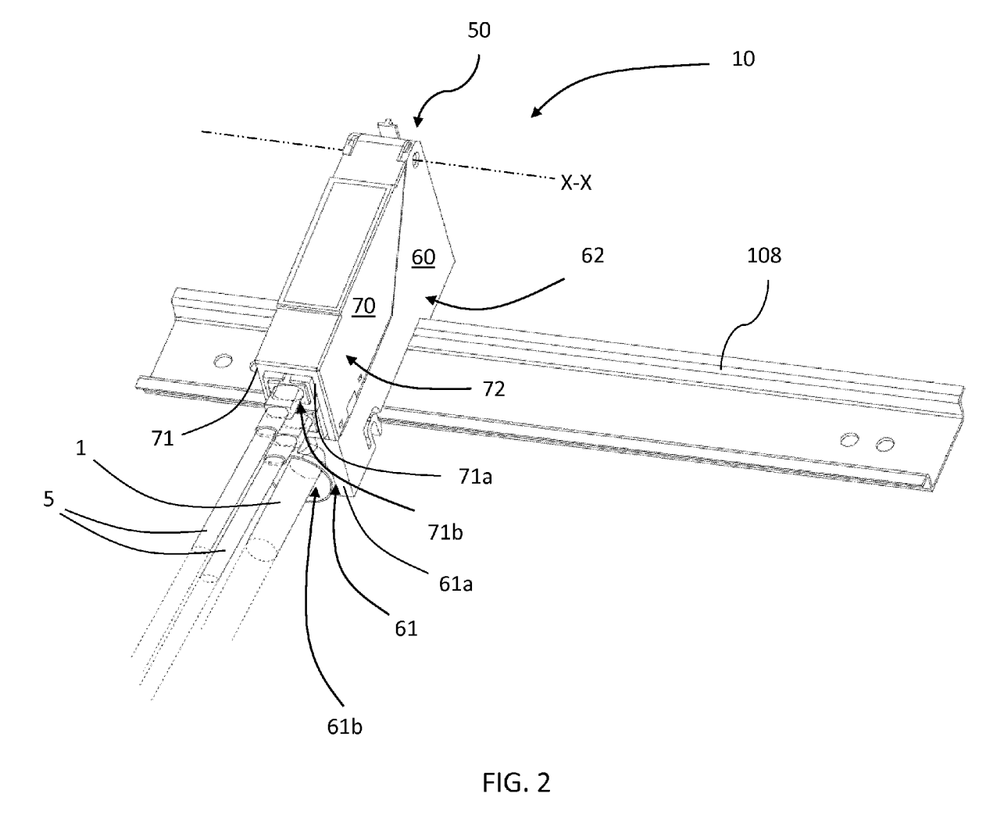
FIG. 2 is a perspective view of an embodiment of an optical termination assembly according to the invention
Figure 3:
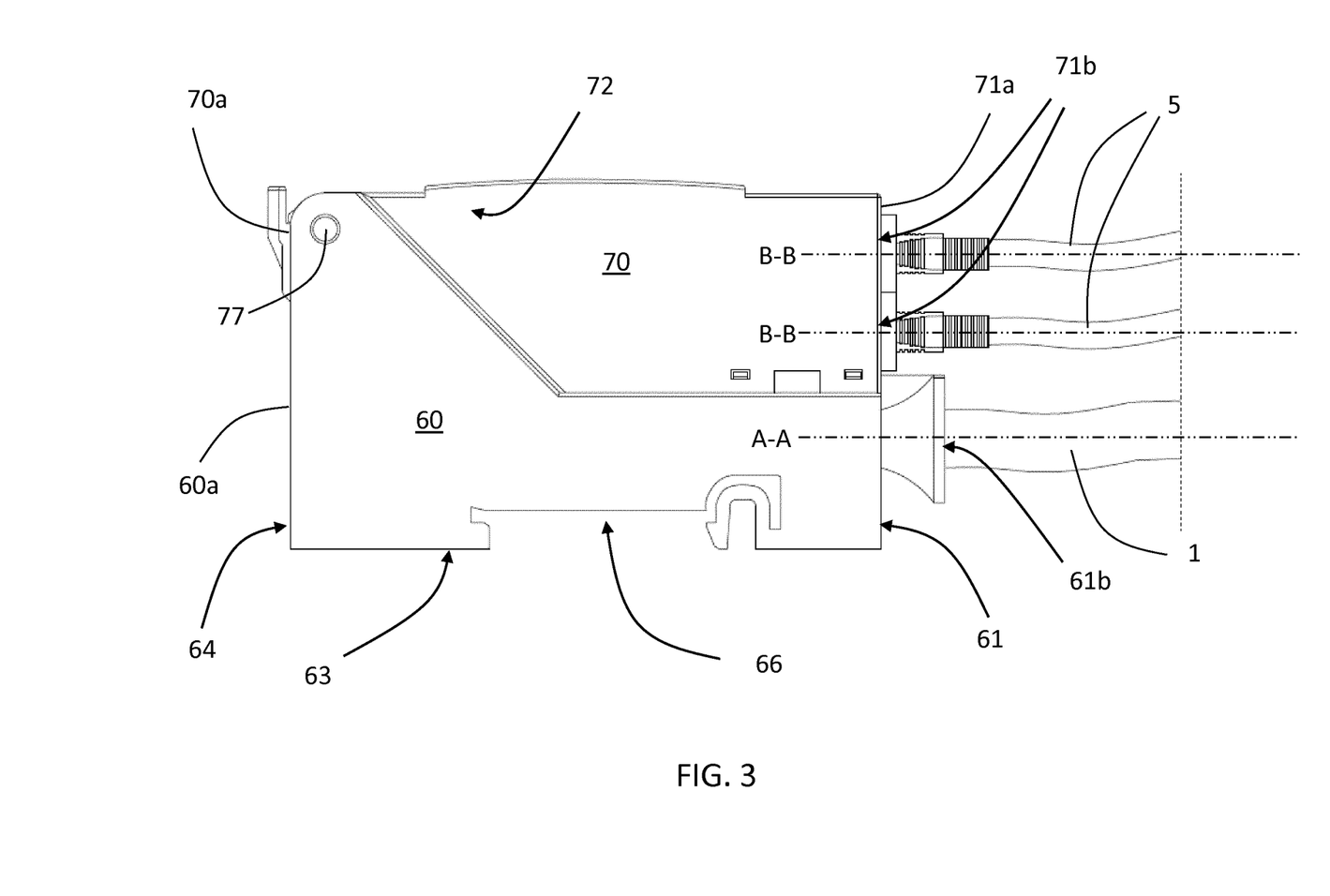
FIG. 3 is a side view of the optical termination assembly of FIG. 2, in a first position.
Figure 4:
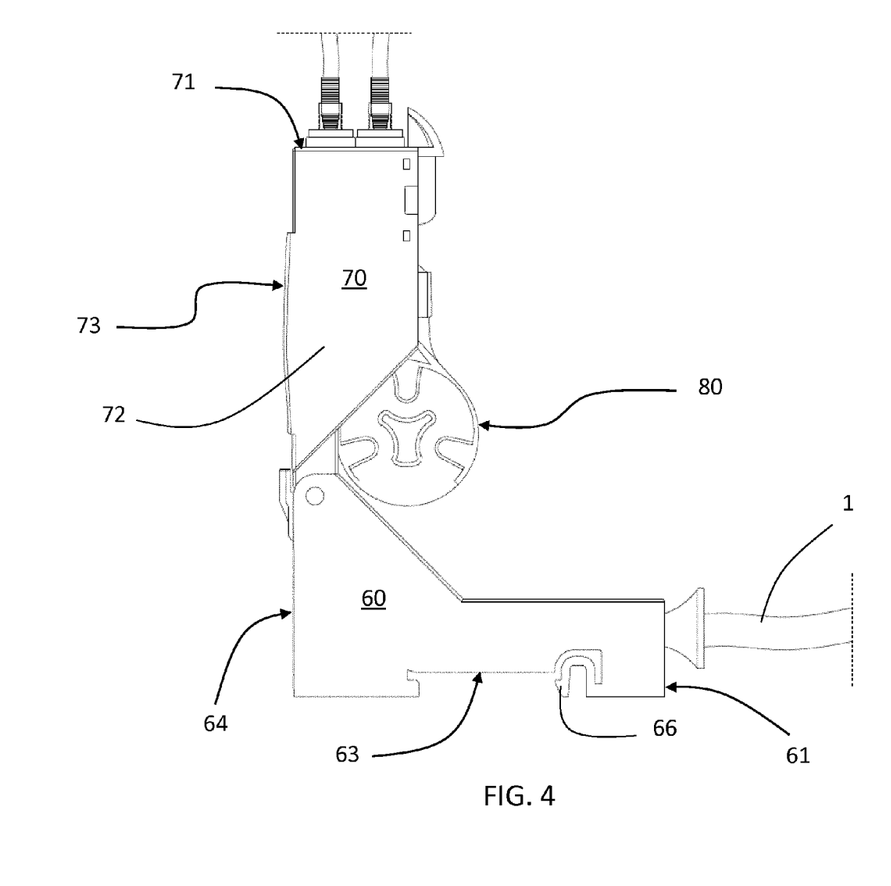
FIG. 4 is a side view of the optical termination assembly of FIG. 2, in a second position.

FIG. 1 shows an electric cabinet 100 comprising an enclosure 101 having a front access opening 102 and a door 103 connected to the enclosure 101 for opening and closing the front access opening 102.

The enclosure 101 may be mounted on a wall (or lay on a floor) and comprises a bottom wall 104, two lateral walls 105, a rear wall 106 and a top wall 107. The bottom wall 104 (or the rear wall 106) has a bottom access opening 104a for passage of cables, preferably optical cables and electric cables.

The rear wall 106 has an inner surface 106a facing inside the enclosure 101. A plurality of mounting members 108 are fixed to the inner surface 106a of the rear wall 106. Preferably, the mounting members 108 are metal rails, more preferably DIN rails.

The electric cabinet 100 comprises one or more electric equipment 109 attached to the mounting members 108 and one or more optical termination assemblies 10, each optical termination assembly 10 comprising an optical drop cable 1 and an optical termination module 50.

The electric equipment 109 may be electric switches and/or electric circuit breakers.

Figure 5:
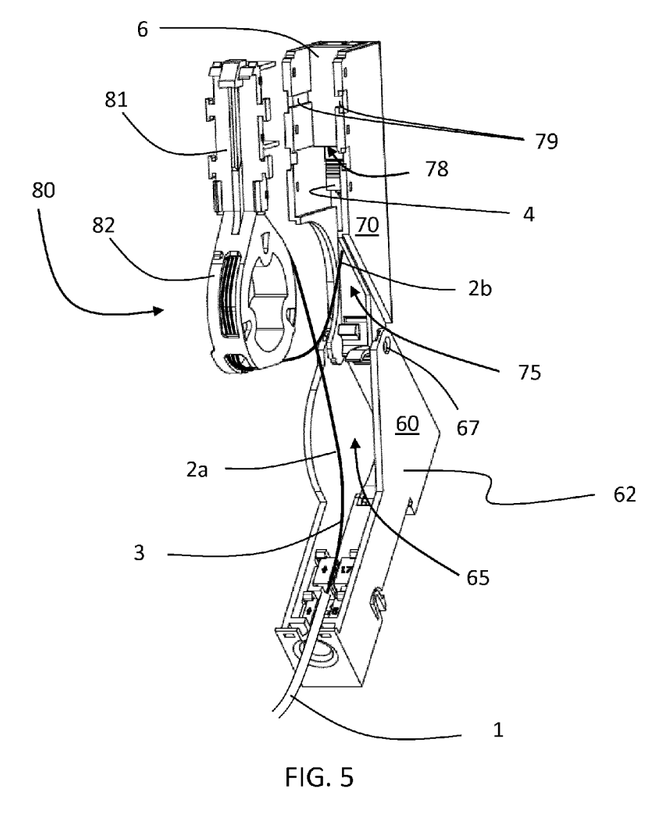
FIG. 5 is a perspective view of the optical termination assembly of FIG. 2.

The optical drop cable 1 may comprise one or more optical fibers 3. Each optical fiber 3 comprises at one end a pre-connectorized optical connector 4 (for example a standard SC connector), that is factory assembled. In the example of FIG. 5, one optical fiber 3 exits from the optical drop cable 1 and ends with pre-connectorized optical connector 4. The pre-connectorized optical connector 4 ends in the shape of a standard ferrule plug housing and the latter is preferably configured to mate with a corresponding fiber optic receptacle/adapter 6 (as, for example, the SC adapter). The adapter 6 is accommodated inside the optical termination module 50 as described in detail in the following description.

The optical termination module 50 houses the end portion of the optical drop cable 1 and is configured for optically connecting the optical fibers 3 of the optical drop cable 1, through respective optical adapters 6, with respective optical customer cables 5.

The optical termination module 50 comprises a fixed part 60 and a movable part 70.

The fixed part 60 is configured to be attached to a mounting member 108 of the electric cabinet 100.

Preferably, the fixed part 60 comprises a bottom wall 61, two parallel lateral walls 62, a rear wall 63 and a top wall 64 delimiting a first seat 65. The bottom wall 61 has a bottom surface 61a with an inlet opening 61b receiving the optical drop cable 1 passing through said inlet opening 61b. The inlet opening 61b has an inlet axis A-A orthogonal to the plane defined by the inlet opening 61b.

According to one embodiment, the rear wall 63 of the fixed part 60 comprises an attachment member 66 for attaching the fixed part 60 to the mounting member 108. Preferably, the attachment member 66 is configured to attach the fixed part 60 to a DIN rail. In the example, the attachment member 66 comprises a recess 66a and an elastic hook 66b for snap attachment of the first 60 to the DIN rail.

The movable part 70 is rotatably attached to the fixed part 60 to move relative to the fixed part 60 about a rotation axis X-X between a first position and a second position.

According to the embodiment shown in the figures, the fixed part 60 has two openings 67 faced between them and the movable part 70 has two pins 77. Each pin 77 extends along the rotation axis X-X and is mounted in a respective opening 67 for allowing rotation of the movable part 70 relative to the fixed part 60 about the rotation axis X-X.

Preferably, the movable part 70 comprises a bottom wall 71, two parallel lateral walls 72 and a front wall 73 delimiting a second seat 75. The bottom wall 71 has a bottom surface 71a with outlet openings 71b configured to receive respective optical customer cables 5. Each outlet opening 71b has a respective outlet axis, each indicated with B-B in the figures. Advantageously, with this arrangement, an operator may allow to an customer to connect its optical customer cable 5 (for example the cable of its modem) to the optical drop cable 1 in a simple and fast manner by rotating the movable part 70 relative to the fixed part 60 up to an angle sufficient for the customer to easily access the bottom surface 71a of the optical module 50. Afterwards, the customer moves the movable part 70 back to the first position in which the optical drop cable 1 and the optical customer cables 5 enter and exits from the bottom surfaces 61a and 71a of the first and movable parts 60, 70 respectively thereby reducing the possibility that the cables 1,5 entangle mutually and with electrical cables of electric equipment arranged adjacent on the same mounting member 108 in the electrical cabinet 100.

The optical drop cable 1 enters the fixed part 60 through the inlet opening 61b, runs through the fixed part 60 and the movable part 70 and terminates with the pre-connectorized optical connectors 4 arranged at the outlet openings 71b of the movable part 70 for optically connecting the optical fibers 3 of the optical drop cable 1 with respective optical customer cables 5.

The first seat 65 and the second seat 75 house respectively a first portion 2a and a second portion 2b of the end portion 2 of the optical drop cable 1. The second portion 2b of the end portion 2 comprises the optical fibers 3 with the pre-connectorized optical connectors 4.

According to a first embodiment, in the first position, the inlet axis A is parallel to each outlet axis B and in the second position each outlet axis B is inclined relative to the inlet axis A at a second angle.

According to a second embodiment, in the first position, the inlet axis A is inclined relative to each outlet axis B at a first angle and in the second position each outlet axis B is inclined relative to the inlet axis A at a second angle greater than the first angle.

Preferably, the second angle between the inlet axis A and the outlet axes B in the second position ranges between 30° and 150°. More preferably, the angle second between the inlet axis A and the outlet axes B in the second position ranges between 60° and 150°.

Preferably, in the first position, the fixed part 60 and the movable part 70 are mutually positioned such that the bottom wall 61 is adjacent to the bottom wall 71 and the lateral walls 62 are adjacent to the lateral walls 72. In the first position, the front wall 73, the rear wall 63 and the top wall 64 with the bottom walls 61,71 and the lateral walls 62,72 delimit the first seat 65 and the second seat 75.

Preferably, in the first position, the bottom surface 61a of the fixed part 60 and the bottom surface 71a of the movable part 70 lay on a same plane or on parallel planes. In the second position, the bottom surface 61 of the fixed part 60 is inclined relative to the bottom surface 71a of the movable part 70.

According to one embodiment, the rotation axis X-X extends perpendicularly to the inlet axis A and outlet axes B. Preferably, the rotation axis X-X is parallel to the mounting member 108. Advantageously, the rotation axis X-X is arranged at an end portion 60a of the fixed part 60 and at an end portion 70a of the movable part 70. According to one embodiment, the end portion 60a of the fixed part 60 and the end portion 70a of the movable part 70 are top end portions. This allows the bottom surface 71a of the movable part 70 to move away from the bottom surface 61a of the fixed part 60 making easier for the customer to access to the openings 71b of the movable part 70 and connect the customer cables 5 to the movable part 70.

In the example of FIG. 5, the two openings 67 are formed in the end portion 60a of the fixed part 60, preferably in the lateral walls 62 of the fixed part 60. In the example of FIG. 5, the two pins 77 are formed in the end portion 70a of the movable part 70, preferably projecting from the lateral walls 72 of the movable part 70 along the rotation axis X-X in opposite directions.

According to one embodiment as shown in the example of FIG. 5, the movable part 70 comprises a seat 78 proximate to the outlet openings 71b. Each seat 78 is adapted to receive a pre-connectorized optical connector 4 of an optical fiber 3 and, preferably, an optical adapter 6. In particular, each seat 78 is provided with retaining members 79 to retain, preferably in a removably way, the pre-connectorized optical connectors 4 and the optical adapters 6.

Figure 6:
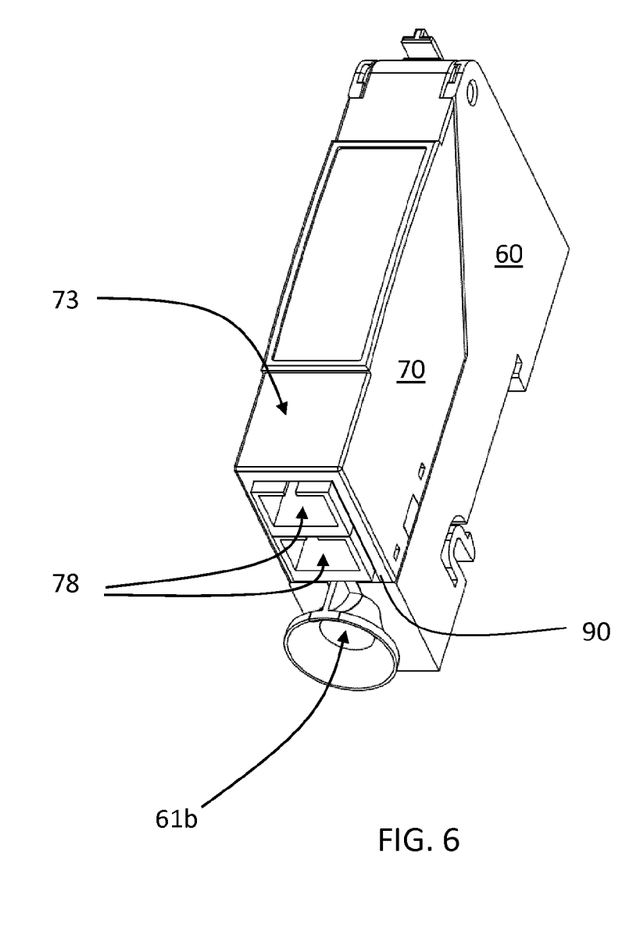
FIG. 6 is a perspective view of an embodiment of an optical termination module according to the invention.

According to one embodiment, locking members 90 are provided for locking the fixed part 60 with the movable part 70 in the first position (as shown in the example of FIG. 6). The locking members 90 are configured to be actuated to unlock the movable part 70 relative to the fixed part 60 to move the movable part 70 relative to the fixed part 60 from the first position to the second position.

Preferably, as shown in the example of FIG. 5, the movable part 70 comprises a fiber storage member 80 arranged inside the movable part 70 and configured to storage slack of fibers of the optical drop cable 1. The fiber storage member 80 is removably attached to the movable part 70.

According to one embodiment, the fiber storage member 80 comprises an attachment portion 81 for removably attach the fiber storage member 80 to the movable part 70 and a fiber storage portion 82 configured to receive and retain slack of the optical fibers 3. Preferably, the fiber storage portion 82 has a circular shape to allow the fibers to be rolled up.

According to one embodiment not shown in the figures, the optical termination module 50 can comprises an optical passive module as a fibre splice, an optical splitter or the like. Generally, a splitter receives a single optical fiber at one end and two or more optical fibers at the opposite end. A splice receives a single optical fiber at one end and a single optical fiber at the opposite end. The optical passive module can be accommodated in the first seat 65 or in the second seat 75 or alternatively can be fixed to the fiber storage member 80. For example, the first portion 2a of the optical drop cable 1 can be connected to an optical passive module and then the latter connected to the second portion 2b of the end portion 2 of the optical drop cable 1. In this way, it is possible to manage connection of the drop cable with an optical fiber directly on field.

The invention claimed is:

1. An optical termination module comprising:
   a fixed part configured to be attached to a mounting member of an electric cabinet, and
   a movable part rotatably attached to said fixed part to move relative to said fixed part about a rotation axis between a first position and a second position, wherein:
   said fixed part comprises an inlet opening configured to receive an optical drop cable, the inlet opening being provided at a bottom surface of the fixed part,
   said movable part comprises one or more outlet openings configured to receive respective one or more optical customer cables, each of the one or more outlet openings being provided at a bottom surface of the movable part, and
   in said first position, the bottom surface of the fixed part and the bottom surface of the movable part are flush with each other and lay on a same plane in side elevational view of the optical termination module.

2. The optical termination module according to claim 1, wherein:
   said inlet opening has an inlet axis,
   each said outlet opening has a respective outlet axis,
   in said first position, said inlet axis is parallel to each said outlet axis, and
   in said second position, each said outlet axis is inclined relative to said inlet axis.

3. The optical termination module according to claim 2, wherein said rotation axis extends perpendicularly to said inlet axis and said one or more outlet axes.

4. The optical termination module according to claim 1, wherein
   in said second position, the bottom surface of the fixed part is inclined relative to the bottom surface of the movable part.

5. The optical termination module according to claim 1, wherein said rotation axis is arranged at an end portion of said fixed part and at an end portion of said movable part.

6. The optical termination module according to claim 5, wherein said end portion of said fixed part and said end portion of said movable part are top end portions of said fixed part and said movable part, respectively.

7. The optical termination module according to claim 1, wherein:
   said movable part comprises one or more seats, and
   each of the one or more sets is arranged proximate to a respective one of the outlet openings and is configured to receive a pre-connectorized optical connector of an optical fiber of an optical drop cable to optically connect said optical fiber with a respective optical customer cable.

8. The optical termination module according to claim 1, wherein:
   said fixed part has a rear portion configured to face a mounting member and an opposite front portion facing said movable part, and
   said rear portion of the fixed part comprises an attachment member configured to attach said fixed part to said mounting member.

9. The optical termination module according to claim 1, further comprising a fiber storage member arranged inside the optical termination module, between said movable part and said fixed part, and configured to store slack of fibers of an optical drop cable.

10. The optical termination module according to claim 9, wherein said fiber storage member is attached to said movable part.

11. An electric cabinet comprising:
    a wall,
    a mounting member fixed to said wall,
    an electric equipment attached to said mounting member, and
    an optical termination module according to claim 1.

12. An optical termination assembly comprising:
    an optical drop cable comprising one or more optical fibers terminated with corresponding pre-connectorized optical connectors, and
    an optical termination module housing an end portion of said optical drop cable, wherein:
    said optical termination module comprises:
    a fixed part configured to be attached to a mounting member of an electric cabinet, and
    a movable part rotatably attached to said fixed part to move relative to said fixed part about a rotation axis between a first position and a second position, wherein:

said fixed part comprises an inlet opening receiving said optical drop cable, the inlet opening being provided at a bottom surface of the fixed part, and said movable part comprises one or more outlet openings configured to receive respective one or more optical customer cables, each of the one or more outlet openings being provided at a bottom surface of the movable part, said optical drop cable enters said fixed part through said inlet opening, runs through the fixed part and the movable part and terminates with said preconnectorized optical connectors arranged at said one or more outlet openings of the movable part for optically connecting said one or more optical fibers of the optical drop cable with respective one or more optical customer cables, and in said first position, the bottom surface of the fixed part and the bottom surface of the movable part are flush with each other and lay on a same plane in side elevational view of the optical termination module.

13. The optical termination assembly according to claim 12, wherein:

said inlet opening has an inlet axis, each said outlet opening has a respective outlet axis, in said first position, said inlet axis is parallel to each said outlet axis, and in said second position, each said outlet axis is inclined relative to said inlet axis.

14. The optical termination assembly according to claim 13, wherein said rotation axis extends perpendicularly to said inlet axis and said one or more outlet axes.

15. The optical termination assembly according to claim 12, wherein in said second position, the bottom surface of the fixed part is inclined relative to the bottom surface of the movable part.

16. The optical termination assembly according to claim 12, wherein said rotation axis is arranged at an end portion of said fixed part and at an end portion of said movable part.

17. The optical termination assembly according to claim 16, wherein said end portion of said fixed part and said end portion of said movable part are top end portions of said fixed part and said movable part, respectively.

18. The optical termination module according to claim 12, wherein:

said movable part comprises one or more seats, and each said seat is arranged proximate to a respective one of the one or more outlet openings, and is configured to receive a pre-connectorized optical connector of an optical fiber of an optical drop cable to optically connect said optical fiber with a respective optical customer cable.

19. The optical termination assembly according to claim 12, wherein:

said fixed part has a rear portion configured to face a mounting member and an opposite front portion facing said movable part, and said rear portion of the fixed part comprises an attachment member to attach said fixed part to said mounting member.

20. The optical termination assembly according to claim 12, further comprising a fiber storage member arranged inside said optical termination module, between said movable part and said fixed part, and configured to store slack of fibers of an optical drop cable.

21. The optical termination assembly according to claim 20, wherein said fiber storage member is attached to said movable part.

* * * * *